F. BERNDT.
DISCHARGE PIPE.
APPLICATION FILED MAR. 19, 1912.
1,046,948. Patented Dec. 10, 1912.
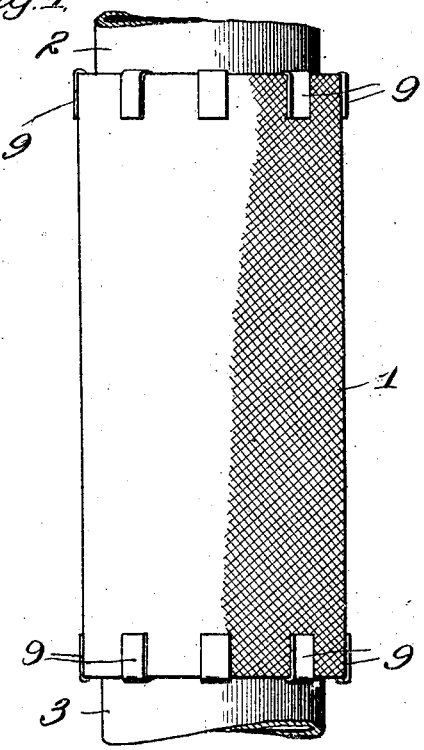
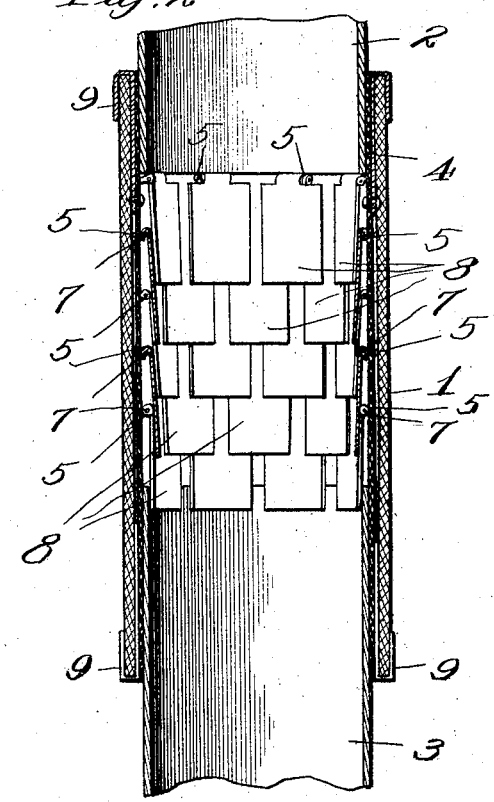
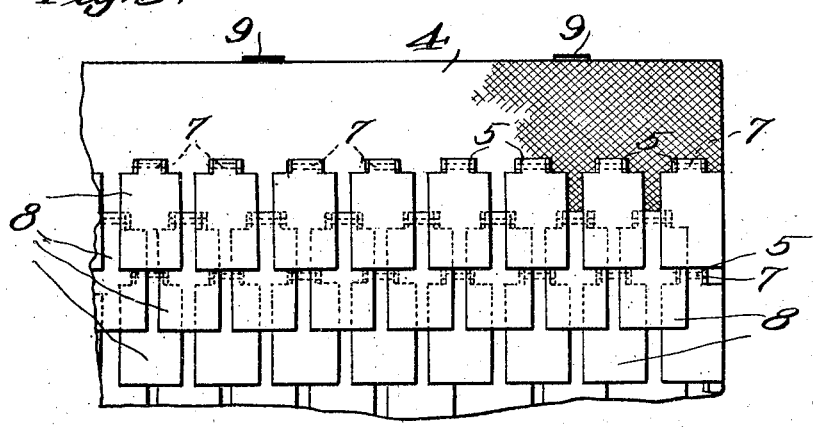
Witnesses
Inventor
Frank Berndt,
By Victor J. Evans,
Attorney

UNITED STATES PATENT OFFICE.

FRANK BERNDT, OF GALVESTON, TEXAS.

DISCHARGE-PIPE.

1,046,948.  Specification of Letters Patent.  Patented Dec. 10, 1912.

Application filed March 19, 1912. Serial No. 684,791.

*To all whom it may concern:*

Be it known that I, FRANK BERNDT, a citizen of the United States, residing at Galveston, in the county of Galveston and State of Texas, have invented new and useful Improvements in Discharge-Pipes, of which the following is a specification.

This invention relates to pipes and more particularly to discharge pipes for dredging machines and the like.

One of the principal objects of the invention is to provide a simple and efficient and cheaply constructed device of this character which is in the nature of a flexible connection between the sections of metallic pipe used to discharge material from the dredger.

A further object of the invention is to provide an attachment in the nature of a lining for the flexible connections between the metallic pipe sections of a dredger discharge which will not interfere with the flexibility of the connection but which will prevent wear thereon so as to lengthen the life of said connection.

Further objects of this invention will appear as the following specific description is read in connection with the accompanying drawing, which forms a part of this application, and in which:—

Figure 1 is a detail side elevation showing a flexible pipe connection connecting two metallic pipe sections. Fig. 2 is a vertical section therethrough. Fig. 3 is a detail plan view of the lining removed from the flexible section.

Referring more particularly to the drawing, 1 represents a flexible pipe section which is constructed of any suitable material and is adapted to connect the metallic sections 2 and 3 of the discharge pipe.

My attachment comprises a flexible lining 4 in the nature of a sheet of fabric whose side edges are overlapped when in place within the flexible section 1 and, if necessary, connected together, such connection, however, has not been shown. Passing through the lining are a plurality of U-shaped members 5 which are arranged in rows, the individual members in each row being staggered with relation to the members in the adjoining rows, each member having the free ends of its legs connected together by pivot screws or bolts 7 upon which are pivoted wear plates or shingles 8. These shingles overlap each other in a similar manner to shingles upon a roof but are freely pivoted to the bolts. One end thereof is adapted to move toward and away from the lining, and also to have a slight lateral movement to prevent jamming. The lining is held against displacement within the flexible pipe section 1 by malleable ears or tongues 9 which are carried at opposite ends of the lining and are adapted to be bent over the flexible section 1, as shown in Figs. 1 and 2.

What is claimed is:—

1. A connector for discharge pipe sections comprising a flexible pipe section, a lining adjustably mounted therein, and a plurality of wear resisting members pivotally mounted on the lining and overlapping each other, said wear resisting members arranged in rows with the individual members of each row in staggered relation to the members in the adjoining rows.

2. A connector for discharge pipe sections comprising a flexible pipe section, a lining adjustably mounted therein, a plurality of wear resisting members pivotally mounted on the lining and overlapping each other, said wear resisting members arranged in rows with the individual members of each row in staggered relation to the members in the adjoining rows, and malleable clips carried by the lining for connecting the same to the flexible section.

In testimony whereof I affix my signature in presence of two witnesses.

FRANK BERNDT.

Witnesses:
 FRED SHROEDER,
 JOHN C. HANSEN.

Copies of this patent may be obtained for five cents each, by addressing the "Commissioner of Patents, Washington, D. C."